April 17, 1951  J. M. TYRNER  2,549,033
APPARATUS FOR FEEDING POWDERED MATERIAL
Filed Sept. 11, 1946  3 Sheets-Sheet 1
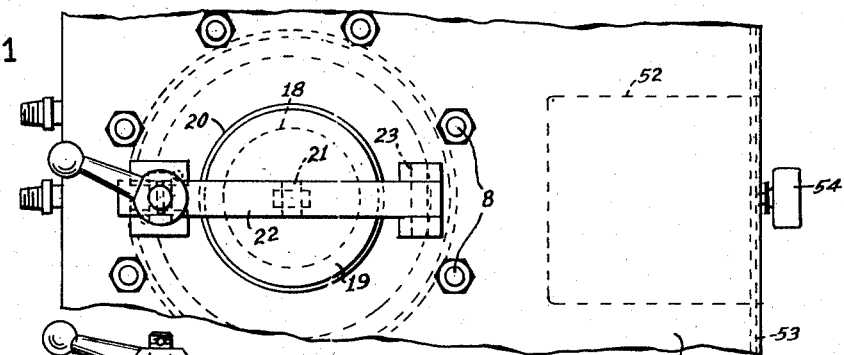
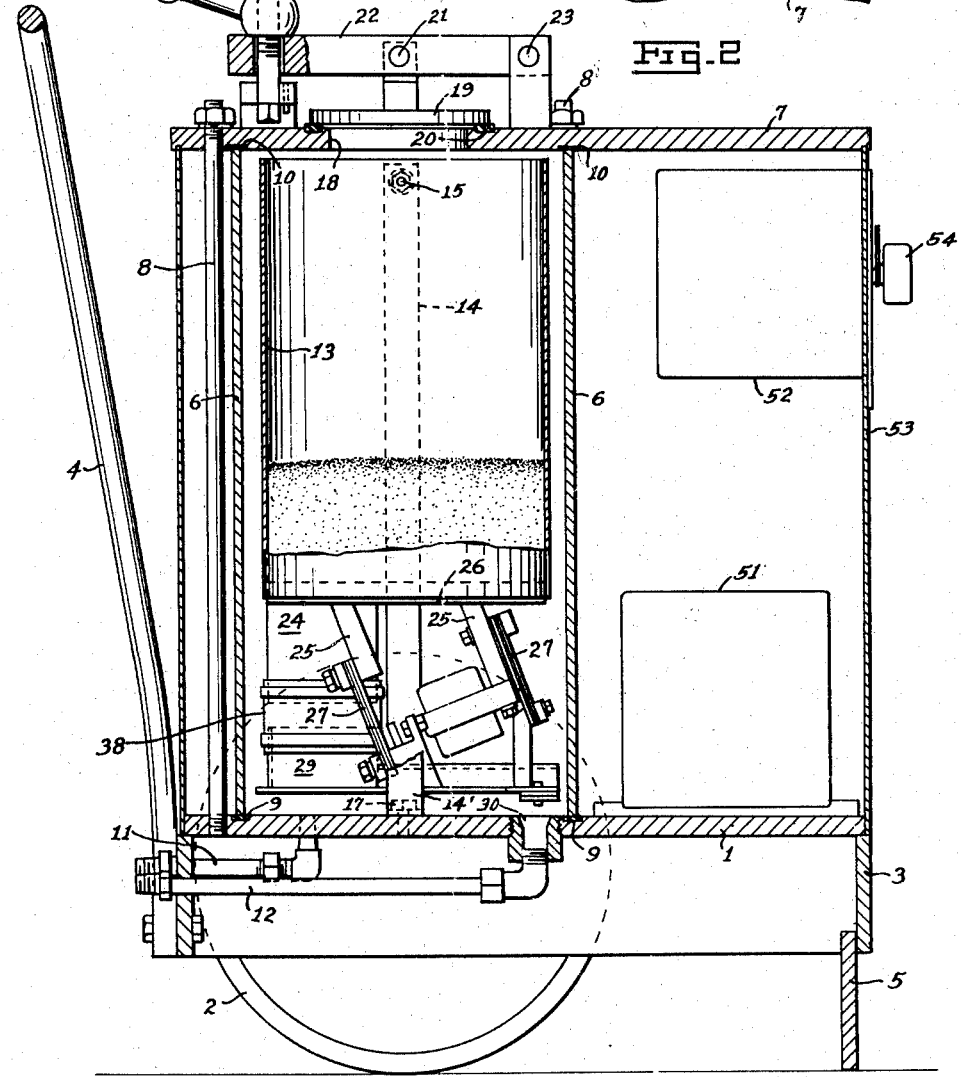
INVENTOR
Joseph M. Tyrner
ATTORNEYS

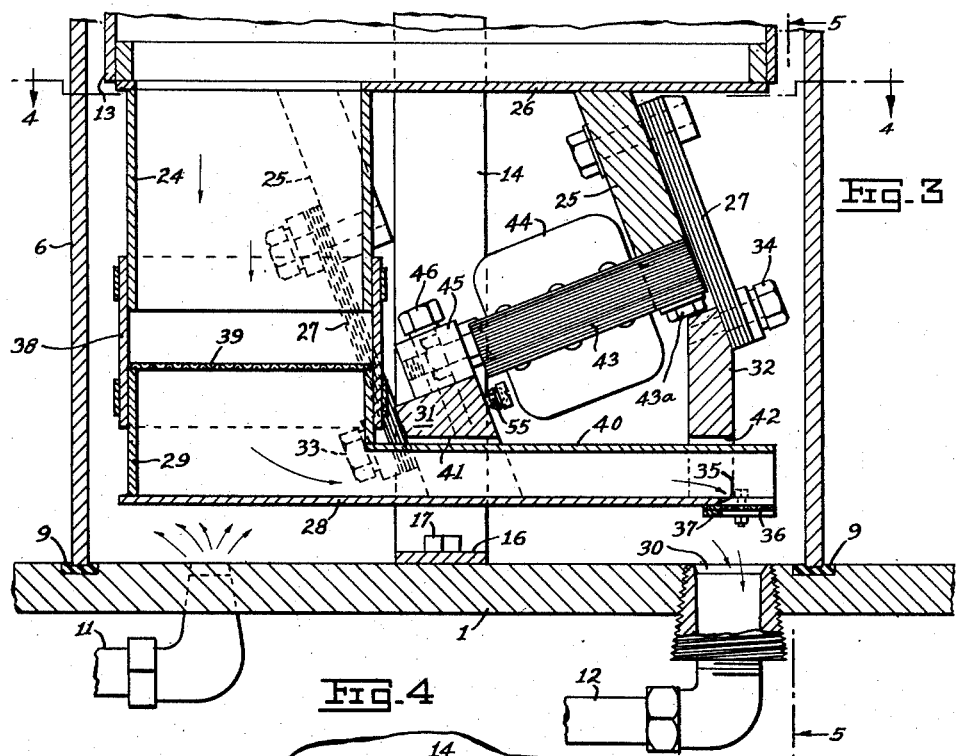
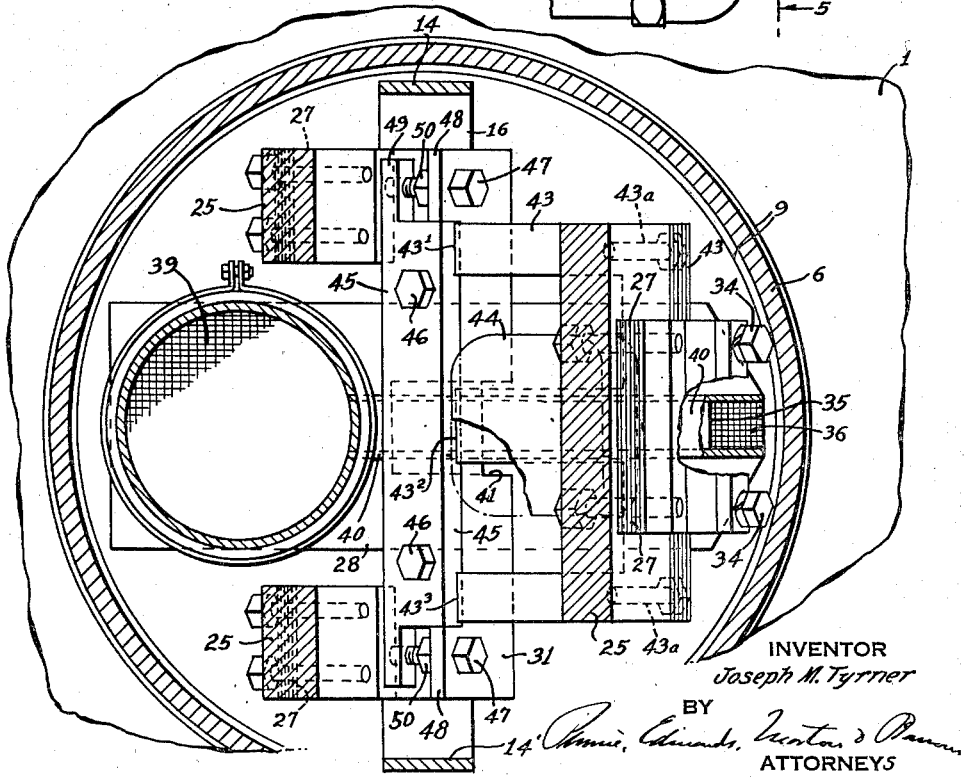

April 17, 1951                J. M. TYRNER                2,549,033
              APPARATUS FOR FEEDING POWDERED MATERIAL
Filed Sept. 11, 1946                              3 Sheets-Sheet 3
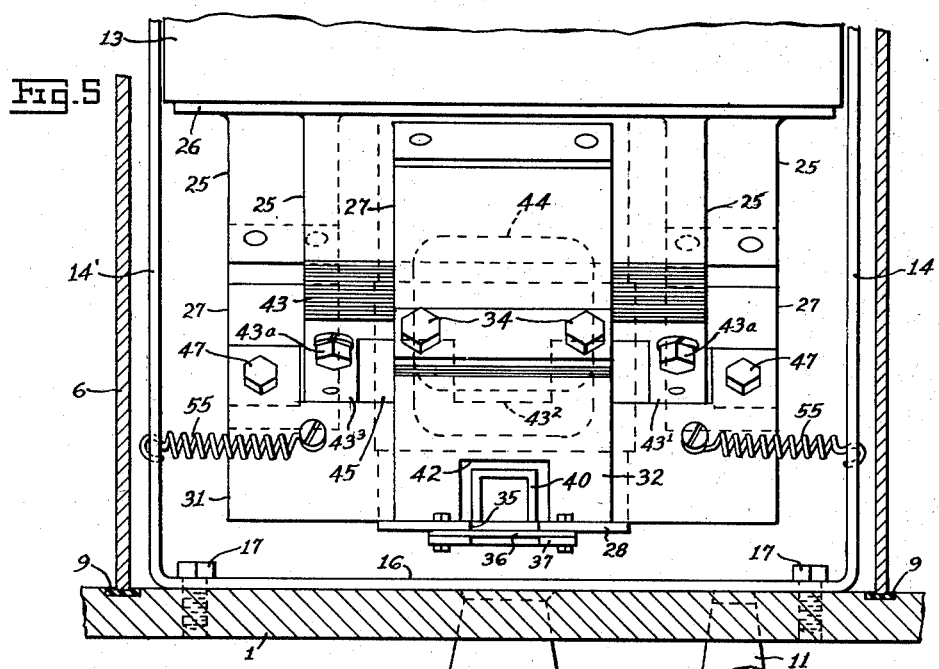
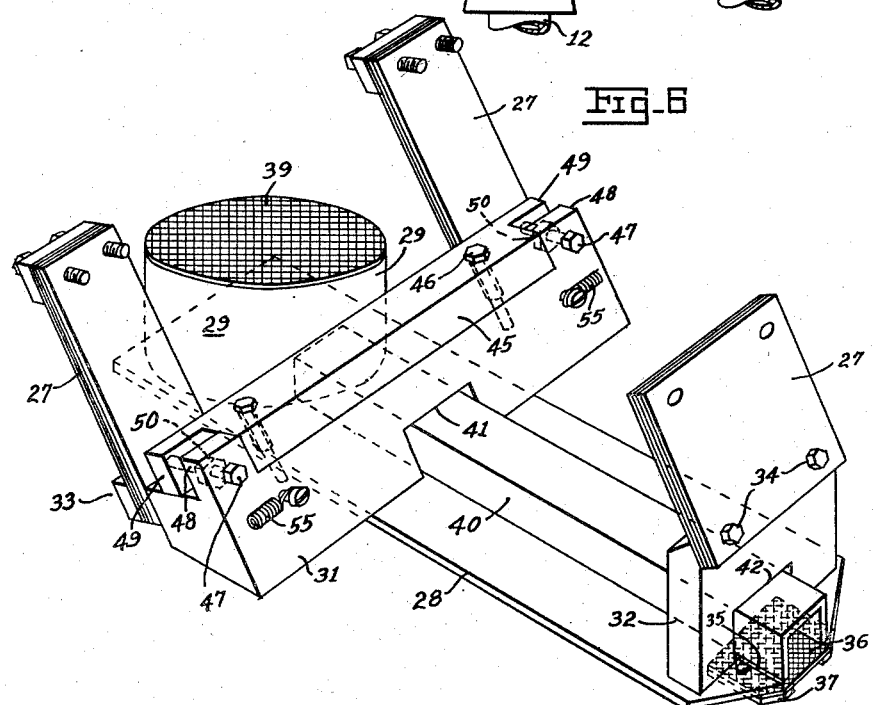
INVENTOR
Joseph M. Tyrner
BY
ATTORNEYS Patented Apr. 17, 1951

2,549,033

UNITED STATES PATENT OFFICE 2,549,033

APPARATUS FOR FEEDING POWDERED MATERIAL

Joseph M. Tyrner, New York, N. Y., assignor to Air Reduction Company, Incorporated, a corporation of New York Application September 11, 1946, Serial No. 696,258

6 Claims. (Cl. 302—56)

This invention relates to apparatus for feeding powdered material, and more particularly to apparatus for feeding it into a gas stream for mixing with and entrainment by the gas.

In the oxygen cutting of stainless steel, and in certain other thermo-chemical operations on iron and steel, it is sometimes desirable to introduce into the oxygen stream finely divided sodium bicarbonate or other powdered material which acts as a flux that facilitates the cutting or other thermo-chemical operation. The apparatus constituting the subject matter of the present application was intended primarily as a flux feeder for feeding flux into an oxygen stream, but it is not limited to such use and may be used for feeding any powdered material into any gas stream, and so far as some features of the invention are concerned they may be used in a feeder for powdered material regardless of whether the powdered material is fed into a gas stream or is fed for some other purpose.

One object of the invention is to provide apparatus, such as a flux feeder, for feeding powdered material into a gas stream in such a way that the rate at which the powdered material is introduced into the gas stream is independent of the gas pressure and velocity. Another object is to provide such an apparatus which is adapted to sift or uniformly distribute the powdered material into the gas stream at a regulated rate.

Other objects are to provide a portable self-contained flux feeder or the like adapted to be moved into position for connection in a gas line and adapted to then feed powdered material into the gas stream as it passes through the flux feeder; to provide an improved vibratory feeder for powdered material; and to provide an improved vibratory feeder that will deliver powdered material by a sifting action.

A portable flux feeder embodying the invention is illustrated in the accompanying drawings, in which:

Figure 1 is a plan view of a portion of the flux feeder;

Fig. 2 is a vertical longitudinal section through the flux feeder;

Fig. 3 is a vertical longitudinal section drawn to a larger scale, through that portion of the flux feeder that is located under the feed hopper;

Fig. 4 is a horizontal section taken on the line 4—4 of Fig. 3;

Fig. 5 is a vertical section taken on the line 5—5 of Fig. 3; and

Fig. 6 is a perspective view of the vibratory subassembly to which powdered material is delivered by the feed hopper and which delivers it to the gas stream in the gas chamber.

Referring first to Fig. 2, the flux feeder shown therein comprises a base plate 1 supported in any suitable way on a pair of wheels, one of which is shown at 2. The base plate 1 has a depending apron 3 to which a handle 4 is attached. A leg 5 secured to the forward portion of the apron 3 serves along with the wheels 2 to support the base plate 1 in a horizontal position.

A hollow cylinder 6 is clamped between the base 1 and an upper plate 7 by means of a circular series of clamping bolts 8 which surround the cylinder (see also Fig. 1). The lower edge of the cylinder rests on a gasket 9 held in an annular recess in the base plate 1 and the upper edge of the cylinder is in contact with a similar gasket 10 held in a recess in the lower face of the upper plate 7. The cylinder 6 together with the portions of the plates 1 and 7 which close the ends of the cylinder constitute a casing forming a gas chamber to which gas may be admitted through an inlet connection 11 leading to the rear part of the gas chamber and from which the gas may be discharged through an outlet connection 12 leading from the forward part of the gas chamber. The inlet and outlet connections communicate with the interior of the gas chamber through openings in the base plate 1 as shown in the drawing.

Within the gas chamber there is a cylindrical hopper 13 for the powdered material to be fed into the gas stream. The hopper is bolted at diametrically opposite points to the legs of a U-shaped strap, the transverse portion of which is secured to the base plate 1. In Fig. 2 one of the legs of the strap appears at 14 and the bolt which attaches one side of the hopper to this leg of the strap is shown at 15. Both legs of the strap are shown in Figs. 4 and 5 at 14 and 14', and the latter figure clearly shows how the transverse portion 16 of the strap is secured to the base 1 by tap bolts or screws 17.

The upper plate 7 is provided with an opening 18 located directly over the hopper 13 and through which powdered material may be supplied to the hopper. A closure plate 19 for the opening 18 seats at its periphery on a gasket 20 held in an annular recess in the upper face of the plate 7 and surrounding the opening. The closure plate 19 is pivotally connected at 21 to an arm 22, one end of which is pivotally connected at 23 to a bracket on the plate 7. The free end of the arm 22 cooperates with a conventional type of clamping means by which the free end of the arm 22 can be clamped down to force the closure plate 19 against its gasket or by which the arm can be released to permit it to be swung upwardly about its pivotal connection 23 to move the closure plate 19 away from the opening 18 and thereby allow the hopper to be filled with powdered material. When the closure plate 19 is clamped in closed position the gas chamber is rendered completely gas-tight by means of the three gaskets 9, 10 and 20.

At the bottom of the hopper, toward the rear of the apparatus, is an outlet tube 24. Three supporting brackets 25 are welded or otherwise rigidly connected at an angle to the lower face of the bottom plate 26 of the hopper. Two of the brackets 25 are located on opposite sideos of the outlet tube 24 and the third one is attached to the forward porion of the hopper bottom 26 and located centrally with respect to the two rear brackets. Fig. 2 shows only two of the brackets 25, namely, the forward bracket and that rear bracket which is on the near side of the outlet tube 24. The rear bracket on the far side of the outlet tube 24 is shown in Fig. 3 while all three brackets are shown in section in Fig. 4.

To each of the supporting brackets is attached a laminated leaf spring 27. The three springs flexibly support a sub-assembly which is best shown in Figs. 3, 4, and 6.

The sub-assembly comprises a rectangular plate 28, to one end of which is welded a tube section 29 which is located coaxially of the outlet tube 24 of the hopper. The plate 28 extends toward the forward part of the gas chamber and projects over the entrance 30 to the gas outlet connection 12. As best shown in Fig. 6, plate 28 is welded or otherwise rigidly secured to the undersurface of a transversely extending bar 31 located just in advance of the tube section 29. The forward end of the plate 28 is welded to the lower surface of a front bar 32. The two rear leaf springs 27 are secured at their lower ends to the rear face of the bar 31 by means of tap bolts 33 and the forward leaf spring 27 is secured at its lower end to the upper portion of the front bar 32 by means of tap bolts 34. The portion of the plate 28 which lies over the entrance 30 to the gas outlet connection has an opening 35. A screen 36 lies under this opening and is clamped to the lower face of the plate 28 by means of a plate 37. The lower end of the outlet tube 24 leading from the hopper is flexibly connected to the upper end of the tube 29 on the plate 28 by means of a short piece of flexible tubing 38 (Figs. 2 and 3). A screen 39 is supported on the upper edge of the tube section 29 (Figs. 3 and 6).

When the vibratory subassembly including the plate 28 is vibrated by the mechanism hereinafter described, the powdered material which is fed by the hopper onto the portion of the plate within the tube section 29 leaves this tube section through an opening in its lower front portion which communicates with a chute formed by a channel-shaped member 40 which is inverted and welded or otherwise rigidly secured to the plate 28, as best shown in Fig. 6. The upper surface of the plate 28 constitutes the floor or lower wall of the chute. The bars 31 and 32 to which the leaf springs 27 are attached are provided with openings 41 and 42 respectively through which the channel-shaped member of the chute passes. The chute guides the powdered material leaving the tube section 29 and delivers it to the screened opening 35 at the forward end of the plate 28.

The vibrating mechanism for vibrating the hopper and the subassembly suspended by the springs 27 preferably comprises an electromagnet whose laminated core 43 is secured to the lower end of the forward bracket 25 by tap bolts 43a, as best shown in Fig. 3. The electromagnet has a winding 44. The particular magnet core shown in the drawings is E-shaped and the three pole faces of the magnet shown at $43^1$, $43^2$ and $43^3$ in Fig. 4 are in confronting spaced relation with a laminated armature 45 which extends lengthwise of and is mounted on the bar 31, as best shown in Fig. 5. The armature may be attached to the bar 31 by means of tap bolts 46 which are threaded into the bar 31 and which pass through openings in the armature of slightly greater diameter than the diameter of the bolts. By turning adjusting screws 47 passing loosely through upstanding projections 48 on the bar 31 and threaded into projections 49 at the ends of the armature, the armature can be adjusted a small amount parallel to itself to vary the size of the three air gaps between the armature and the pole faces of the magnet. Lock nuts 50 on the adjusting screws 47, when tightened, lock the adjusting screws against turning and hold the armature in adjusted position.

Alternating current is supplied to the magnet from a constant voltage transformer 51 (Fig. 2) mounted on the base plate 1, and the voltage input to the transformer is made adjustable, as by a "Variac" represented at 52, which may be mounted at the rear of a control panel 53 extending from the base plate 1 to the upper plate 7 and which closes off the front of the flux feeder. The "Variac" may be adjusted by means of a knob 54 at the outer side of the panel 53.

A tension spring 55 is preferably connected between each end of the bar 31 and the adjacent leg of the U-strap that supports the feed hopper as shown in Fig. 5.

The operation of the flux feeder is as follows: It is wheeled to the position where it is desired to connect it in a gas line, such as an oxygen line which supplies cutting oxygen to a torch. The gas chamber is inserted in the gas line by means of the inlet and outlet connections 11 and 12. Before the gas is turned on the hopper is filled to the desired level with powdered material, such as a finely divided sodium bicarbonate, by unclamping and removing the closure plate 19 and introducing the powdered material into the hopper through the feed opening 18. Then the closure plate 19 is clamped in closed position, the oxygen supply is turned on, and the current supply to the magnet is turned on. The current used is preferably a single phase, 60 cycle alternating current. The magnet being connected to the hopper, and the armature being connected to the substructure suspended by the leaf springs 27, these two parts will vibrate relative to each other, the relative vibration being permitted by the leaf springs and the flexible connection 38 between the feed tube 24 on the hopper and the tube section 29 on the plate 28. The parts vibrate at twice the frequency of the supply voltage. If the bolts 15 which support the hopper on the legs of the U-shaped strap are not tight they act as pivots about whose axis the hopper vibrates. If they are tightened the inherent resiliency of the legs of the strap permits the hopper to vibrate. The region at which the hopper 13 is clamped or pivotally connected to the legs of the strap by the bolts 15 is preferably a region that tends to be a node when the hopper vibrates. Since the hopper and the substructure suspended by the leaf springs 27 are quite free to vibrate except for the restraining action of the leaf springs, which are entirely free from stress when the apparatus is not in use; the hopper and substructure will vibrate about their common center of gravity. The weight of the suspended hopper and substructure are concentrated as far from the point of suspension as possible, giving it a maximum moment of inertia with respect to this point. This makes the moment of inertia of the powdered material about this suspension point negligible compared with the moment of inertia of the hopper and substructure. The amplitude of vibration is a function of the moment of inertia; thus the amplitude of vibration, and hence the rate of feed, is relatively independent of the depth of powdered material in the hopper.

The vibration of the hopper feeds the powdered material through the outlet tube 24 and flexible tube 38 and sifts it through the screen 39 onto the plate 28 of the substructure. This plate constitutes a platform along which the powdered material is caused to move by the vibration of the substructure. As the powdered material progresses along the platform 28 it is guided by the inverted channel member 40 and is delivered to the opening 35 at the forward end of the plate 28 where it is sifted through the screen 36 into the oxygen as it enters the outlet connection 12. The powdered material is thus uniformly distributed into the gas stream at a regulated rate and is mixed with the gas and entrained by the gas stream. The rate at which the powdered material is fed into the gas stream may be varied by adjusting the "Variac" 52 and is maintained independent of fluctuations in line voltage by the use of the constant voltage transformer 51.

While the powdered material is preferably distributed into the gas as it is entering the entrance 30 to the outlet connection 12, it may be distributed or sifted into the gas chamber at some other point. By feeding the powdered material into the gas stream in the manner above described, the rate at which the powdered material is introduced into the gas stream is independent of the gas pressure and velocity and substantially independent of the depth of powdered material in the hopper. The apparatus gives a uniform supply of powdered material, which is particularly important in feeding flux into an oxygen stream to be used in the cutting of stainless steel and for similar purposes.

The apparatus is portable, and the base plate 1 with its wheels and the handle 4 constitute a hand truck by which the feeder may be readily moved to the location where it is to be inserted in the gas line.

It will now be apparent that while the apparatus is particularly adapted for feeding flux into an oxygen stream, it may be used for feeding any powdered material into any gas stream, and in fact some features of the apparatus are useful in a feeder for feeding, distributing, or sifting powdered material regardless of whether the powdered material is fed into a gas stream or is fed for some other purposes.

I claim:

1. Apparatus for feeding powdered material into a gas stream comprising a gas chamber having a gas inlet and a gas outlet, a hopper for the powdered material located within the gas chamber and having a discharge outlet, a platform leading to said gas outlet and onto which powdered material may be discharged through said hopper outlet, a base, means supporting the hopper on the base so that the hopper can vibrate freely independently of and relative to the base, resilient means supporting the platform for vibrating movement relative to the hopper, and vibrating means for the hopper and the platform, said vibrating means comprising an electromagnet and an armature one of which is rigidly secured to the hopper independently of said base for free movement in unison with the hopper and the other of which is rigidly secured to the platform for free movement in unison therewith, vibration of the electromagnet and the armature in differing phase relation upon energization of the electromagnet thereby producing simultaneous vibration of the hopper and platform in differing phase relation.

2. Apparatus for feeding powdered material comprising a hopper for the material having a discharge outlet in its lower portion, a platform onto which the powdered material can be discharged through said hopper outlet and extending to a place where the material is discharged by the platform, a base, means supporting the hopper from the base, said supporting means being constructed and arranged to allow the hopper to vibrate freely independently of and relative to the base, resilient means by which the platform is suspended from the hopper permitting vibration of the platform relative to the hopper, and vibrating means for the hopper and the platform, said vibrating means comprising an electromagnet and an armature, one of which is rigidly secured to the hopper independently of said base for free movement in unison with the hopper and the other of which is rigidly secured to the platform for free movement in unison therewith, vibration of the electromagnet and the armature in differing phase relation upon energization of the electromagnet thereby producing simultaneous vibration of the hopper and platform in differing phase relation.

3. Apparatus for feeding powdered material including a vibrating system which comprises a hopper for the material having a discharge outlet at its lower portion and a platform resiliently supported from the hopper and onto which the powdered material is discharged through said hopper outlet, a base, means supporting the vibrating system on the base at a node of vibration, and vibrating means for the hopper and the platform, said vibrating means comprising an electromagnet and an armature one of which is rigidly secured to the hopper independently of said base for free movement in unison with the hopper and the other of which is rigidly secured to the platform for free movement in unison therewith, vibration of the electromagnet and the armature in differing phase relation upon energization of the electromagnet thereby producing simultaneous vibration of the hopper and platform in differing phase relation.

4. Apparatus for feeding powdered material including a vibrating system which comprises a hopper for the material having a dscharge outlet at its lower portion and a platform resiliently supported from the hopper and onto which the powdered material is discharged through said hopper outlet, a base, means supporting the vibrating system on the base so that the entire vibrating system vibrates on said supporting means about its common center of gravity, and vibrating means for the hopper and the platform, said vibrating means comprising an electromagnet and an armature, one of which is rigidly secured to the hopper independently of said base for free movement in unison with the hopper and the other of which is rigidly secured to the platform for free movement in unison therewith, vibration of the electromagnet and the armature in differing phase relation upon energization of the electromagnet thereby producing simultaneous vibration of the hopper and pltaform in differing phase relation.

5. Apparatus for feeding powdered material into a gas stream comprising a gas chamber having a gas inlet and a gas outlet, a hopper for the powdered material, a platform located below the hopper and leading to a discharge point at said gas outlet, an outlet conduit leading from the hopper to the platform, means forming with the platform and said outlet conduit a completely enclosed path for the powdered material extending to said discharge point, a base, means supporting the hopper on the base so that the hopper can vibrate freely independently of and relative to the base, resilient means supporting the platform for vibratory movement relative to the hopper, and vibrating means for the hopper and the platform whereby powdered material is fed from the hopper along an enclosed path to said discharge point where it is introduced into the gas leaving the gas chamber through the gas outlet, said vibrating means comprising an electromagnet and an armature, one of which is rigidly secured to the hopper independently of said base for free movement in unison wtih the hopper and the other of which is rigidly secured to the platform for free movement in unison therewith, vibration of the electromagnet and the armature in differing phase relation upon energization of the electromagnet thereby producing simultaneous vibration of the hopper and platform in differing phase relation.

6. Apparatus for feeding powdered material into a gas stream comprising a gas chamber having a gas inlet and a gas outlet, a hopper for the powdered material having a discharge outlet, a platform leading to said gas outlet and onto which powdered material may be discharged through said hopper outlet, a base, means supporting the hopper on the base so that the hopper can vibrate freely independently of and relative to the base, resilient means supporting the platform for vibrating movement relative to the hopper, and vibrating means for the hopper and the platform, said vibrating means comprising an electromagnet and an armature, one of which is rigidly secured to the hopper independently of said base for free movement in unison with the hopper and the other of which is rigidly secured to the platform for free movement in unison therewith, vibration of the electromagnet and the armature in differing phase relation upon energization of the electromagnet thereby producing simultaneous vibration of the hopper and platform in differing phase relation.

JOSEPH M. TYRNER.

REFERENCES CITED

The following references are of record in the file of this patent:

UNITED STATES PATENTS

| Number | Name | Date |
|---|---|---|
| 325,016 | Ryan | Aug. 25, 1885 |
| 741,116 | DeFrance | Oct. 13, 1903 |
| 799,808 | Thompson | Sept. 19, 1905 |
| 1,548,324 | Kaemmerling | Aug. 4, 1025 |
| 1,991,403 | McManama | Feb. 19, 1935 |
| 2,031,369 | Holbeck | Feb. 18, 1936 |
| 2,098,034 | Flint et al. | Nov. 2, 1937 |
| 2,100,878 | Shallock | Nov. 30, 1937 |
| 2,164,483 | Watson et al. | July 4, 1939 |
| 2,240,205 | Call | Apr. 29, 1941 |
| 2,297,791 | Ness | Oct. 6, 1942 |
| 2,368,395 | Allen | Jan. 30, 1945 |